June 25, 1957 D. L. BLANEY 2,797,264

MAGNETIC VOLUME CONTROL SYSTEM

Filed Oct. 30, 1948

INVENTOR.
DOROTHY L. BLANEY
BY Val R. Goolaw

United States Patent Office 2,797,264

Patented June 25, 1957

2,797,264

MAGNETIC VOLUME CONTROL SYSTEM

Dorothy L. Blaney, Los Angeles, Calif., assignor to Radio Corporation of America, a corporation of Delaware Application October 30, 1948, Serial No. 57,436

6 Claims. (Cl. 179—100.2)

Figure 1:
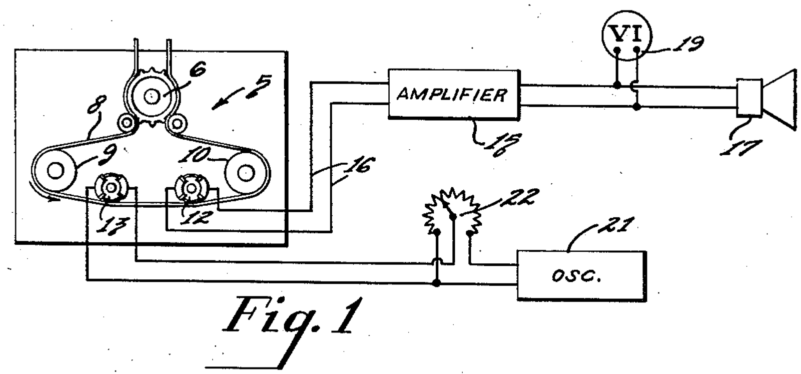

This invention relates to magnetic sound recording and reproduction, and particularly to the level or volume control of sound during reproduction. It is especially applicable to rerecording systems.

With the advent of sound recording on magnetic record mediums, such as film or tape for commercial use, as in the production of motion pictures, the same problem arises in obtaining a uniform average amplitude level for a series of sound sequences as in photographic recording. That is, during the recording of the different sequences, which are used to make up the final picture, one operator may record the sound at a different average level from that of another operator, which usually occurs, with the result that when the sequences are reproduced in succession, the variation is noticeable and undesirable. In photographic recording, variations in level may be made uniform by simply changing the gain of the amplifier between a reproducer and a recorder, and this may be done in some instances during the reproduction of magnetic records. However, with magnetic records, not only can the reproduced sound from the reproduced record be varied to provide a uniform level for all sequences on a new record, but the original record may be simultaneously modified to have a uniform level so that subsequent changes in the level are unnecessary.

With variable density records, the final print may be averaged by varying the intensity of the printing light, which is done during the printing operation. In variable area records, it may be accomplished by automatically varying the transmission between the film reproducer, in which the sequences of various levels are being reproduced, and the recorder, as disclosed and claimed in Best U. S. Patent No. 2,265,097 of December 2, 1941. Another type of rerecording system which controls the gain of various records being reproduced for combination into a composite record is disclosed and claimed in Kreuzer U. S. Patent No. 2,320,524 of June 1, 1943.

The present invention embodies certain features of the above mentioned patents, but also provides a novel volume control which results not only in average level reproduction of the non-uniform level sequences, but also makes the original record of uniform average level so that upon subsequent reproduction thereof no control is necessary. Not only is the invention applicable to providing a constant average level for a series of sequences of different average levels, but it also may be employed to reduce certain sections of a sequence, such as points of harsh sibilant sounds or other undesired noises at certain points in the sound track. These spot reductions in level may be obtained automatically or by hand-operated equipment wherein the film is moved by hand.

The principal object of the invention, therefore, is to facilitate the reproduction or rerecording of a magnetic sound record.

Another object of the invention is to improve the control of the amplitude levels of sound reproduced from a series of magnetic record sound sequences of varying levels.

A further object of the invention is to automatically vary the amplitude level of various sound sequences of varying levels and simultaneously change the levels of the record being reproduced to a constant average value.

A still further object of the invention is to reduce a series of sound sequences to constant uniform values during the reproduction thereof, or to reduce the amplitudes of the sound record at certain points thereon.

Figure 2:
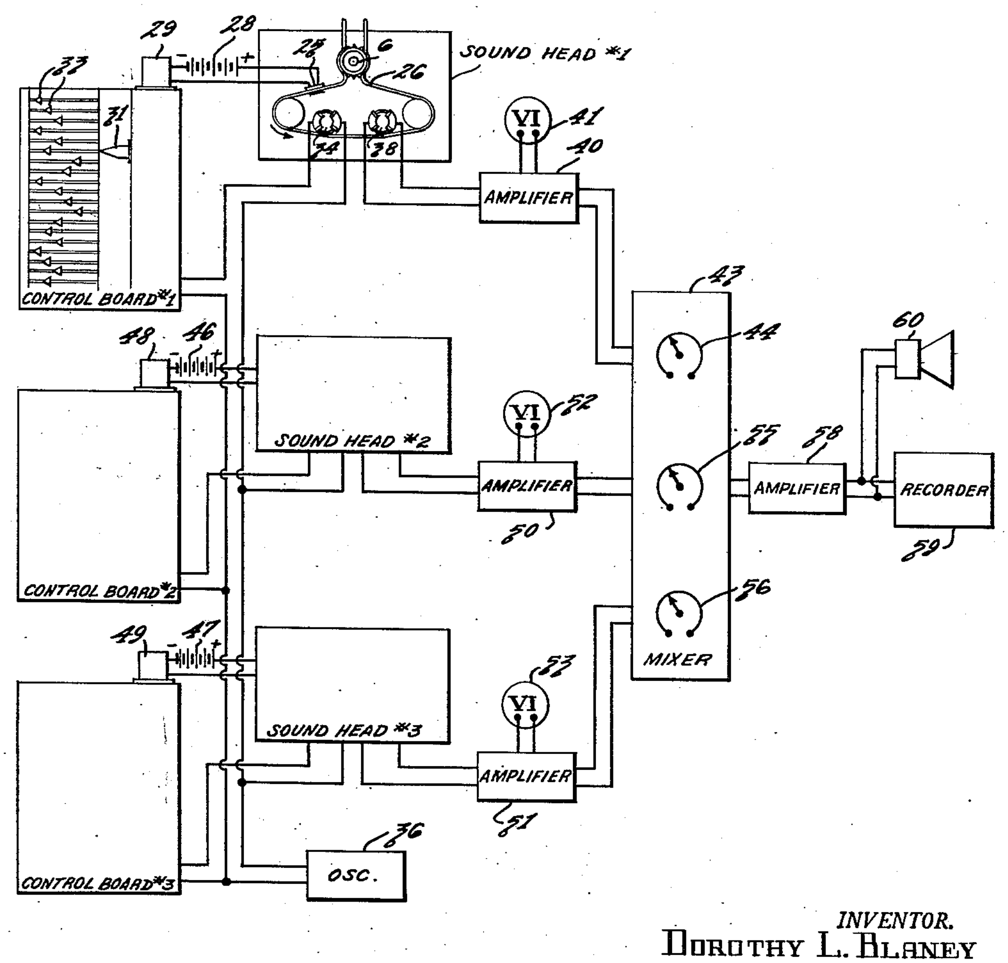

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a diagrammatic view of a manual system for making uniform the levels of a plurality of sound sequences or points in accordance with the invention, and Fig. 2 is a diagrammatic view of an automatic rerecording system in which one or more of the levels of a plurality of magnetic sound records are automatically made uniform during reproduction and combination.

Referring now to the drawings, in which the same numerals identify like elements, a sound head, indicated generally at 5, has a sprocket 6 which advances a magnetic film or tape 8 around guide rollers 9 and 10 and past a magnetic reproducing head 12 and a magnetic erasing head 13, as shown by the arrow. The magnetic tape 8 may be made up of a series of sound sequences corresponding to certain picture sequences, the sound sequences varying in average recorded level. If these sequences were reproduced normally through the amplifier 15, the input of which is connected to the magnetic reproducing head 12 by conductors 16, and with a loud speaker 17, the average level thereof would vary in accordance with the average level on the tape. This could not only be detected audibly, but also visually, by a volume indicator meter 19.

It is realized that, by varying the gain of the amplifier 15, the output at speaker 17 could be controlled. However, the present invention is directed to a system wherein the level of sound as it reaches reproducing head 12 is controlled so that not only does the output at 17 have a constant average value, but as the film is passed through the head 5, all sequences thereon will be modified to have the same level. This is accomplished at eraser head 13 connected to a source of erasing currents, such as an oscillator 21, the energy from the oscillator to the head 13 being controlled by a potentiometer 22. Thus, the operator need only vary the energy to the erasing head 13 to reduce the level of any sequence to that of the sequence having the lowest level on the roll of tape.

In order to know what adjustments are to be made at 22, the tape 8 may be reproduced at a fixed amplification and a cue sheet made in accordance with the levels of the various sequences. Since the footage of each sequence is known, the operator need only change the setting of the potentiometer 22, as the footage marks indicate when each sequence reaches the erase head 13.

Another method of operating is to transpose the positions of the reproducing head 12 and erase head 13 so that the travel of the film, as shown by the arrow, would first be reproduced before any erasing effect is applied. This would eliminate cue sheets, but might not be as accurate as a previous reproduction with cue sheets. The varying average levels, however, would be reproduced.

Referring now to Fig. 2, in which an automatic rerecording system is shown, three sound heads No. 1, No. 2, and No. 3 are indicated, each of which is similar to the sound head 5 of Fig. 1, except for the inclusion of a breaker switch box 25, such as shown in the above mentioned Best patent. That is, the tape 26 in sound head No. 1, and the tapes in the other sound heads, may be notched or otherwise modified so that electrical contacts are made to close associated circuits whenever the notches or other markings on the tapes pass the breaker switches such as shown at 25. When a contact of switch 25 is made, energy is supplied from a battery 28 to a solenoid 29 which will drop a contactor 31 to the next resistor bar on a resistor box or control board No. 1. This control board is shown in the above mentioned Kreuzer patent, and is of the type used in photographic printing, wherein a plurality of sliders 33 may be adjusted to control the current passing to a controlled element, such as a lamp in a printer, or, in the present instance, to the erase head 34 of sound head No. 1. That is, each time a contact is made at 25, the slider will be released to contact the next resistor, which will control the erasing energy supplied from an oscillator 36 to the erase head 34, and thus provide the desired amount of amplitude reduction on the tape 26.

The sound is detected by a reproducing head 38 and fed into an amplifier 40 connected to a volume indicator 41 and a mixer panel 43. The level of the output of head 38 may be controlled by a potentiometer 44. In addition to the sound head No. 1, two additional sound heads No. 2 and No. 3 are illustrated, having their corresponding control boards No. 2 and No. 3 with energy sources 46 and 47 and solenoids 48 and 49, respectively. The oscillator 36 supplies the erasing current to the respective erasing heads under control of the various control boards, each magnetic sound record being pre-cued to control the control boards No. 1, No. 2, and No. 3. The outputs of sound heads No. 2 and No. 3 are fed to the mixer panel 43 through amplifiers 50 and 51, respectively, to which volume indicators 52 and 53 are connected. These two channels are under the control of potentiometers 55 and 56, the output of which is fed into the amplifier 58 feeding a recorder 59 and a monitor speaker 60.

In the operation of the above system, the potentiometers 44, 55, and 56 will be adjusted to provide the proper amplitude relationship between the sound track on tape 26, which may be a plurality of dialogue sequences, and the sound tracks on the tapes in sound heads No. 1 and No. 2, which may be music and background effects. The control boards No. 1, No. 2, and No. 3 not only provide uniform signal levels into the mixer panel 43, but also provide the original sound records with uniform levels after once passing through the reproducers. The cues may also be adjusted so that excessive noise points or excessive sibilants may be reduced at a specific point on the tape.

The above described invention may also be used to eliminate tape splice noises or any other noise occurring during silent passages by impressing the erasing energy to the tape as it passes the erasing head. The application of the erasing energy may be done gradually or "feathered" on both sides of a splice or noise point by hand manipulation of potentiometer 22, or may be done electrically with timing circuits, such as used in photographic noise reduction systems. The application rate should be below audibility. The automatic system of Fig. 2, where the tape is notched, will apply and remove the erasing energy as desired.

I claim:

1. A magnetic sound rerecording system for rerecording from a magnetic film made up of a plurality of sound sequences having different average sound levels to a second film to provide said second film with sound sequences at the same average sound level, comprising means for reproducing in succession said plurality of sound sequences of different average levels, means for erasing the higher average sound level sequences in accordance with the differences between the average sound levels of the successive sound sequences, and means for recording all of said reproduced sound sequences.

2. A magnetic sound reproducing system for reproducing at substantially the same average level a plurality of sound sequences of different average levels serially arranged on a magnetic film comprising a magnetic reproduce head, a magnetic erase head, means for advancing said magnetic film past said heads in series, means for supplying erasing energy to said erase head, and means including variable means whereby the amount of said energy supplied to said erase head during the passage of any particular sound sequence reduces the average level of said sequence to that of the average level of the lowest sound sequence.

3. A magnetic sound rerecording system, for rerecording in composite form on a single magnetic film sound sequences from a plurality of magnetic sound films, at least one of which is made up of a plurality of sound sequences having different average levels, said system comprising magnetic reproducing heads for each of said plurality of magnetic sound films, an erasing head for at least one of said magnetic films, a source of erasing current for said erasing head, means for automatically varying the amount of current fed to said erasing head from said source of erasing current in accordance with the variation in level of said sequences on said one magnetic film, and means for combining the outputs of said reproducing heads into a composite sound film record on said single film.

4. A magnetic sound rerecording system in accordance with claim 3, in which said first mentioned means includes a circuit breaker under control of one of said films, a resistor box, and a circuit from said source of erasing current through said resistor box to said erasing head.

5. A rerecording system for rerecording into a composite, single, sound record on a single film a plurality of magnetic sound records comprising a magnetic reproducer for each of said plurality of records, at least one breaker switch actuated by at least one of said records, an eraser head for at least one of said records, at least one resistor box connected to said breaker switch, a source of erasing energy for said eraser head, said source being connected to said head through said resistor box for varying the amount of erasing energy fed to said eraser head, and means for combining said plurality of reproduced records into a composite record.

6. A rerecording system in accordance with claim 5, in which a breaker switch, a resistor box, and an erasing head are provided for each of said plurality of records, said erasing heads being energized from said source of erasing energy through respective resistor boxes under control of respective breaker switches.

References Cited in the file of this patent

FOREIGN PATENTS

| | | |
|---|---|---|
| 881,562 | France | Apr. 29, 1943 |